United States Patent Office 3,828,018
Patented Aug. 6, 1974

3,828,018
$N^\alpha$-[6 - (CARBOBENZYLOXYAMINO)HEXANOYL]-$N^\epsilon$ - (SUBSTITUTED CARBOBENZYLOXY) - L-LYSINE COMPOUNDS
Linneaus C. Dorman, Midland, Mich., assignor to The Dow Chemical Company, Midland, Mich.
No Drawing. Filed Sept. 25, 1972, Ser. No. 291,814
Int. Cl. C07c *103/52;* C08h *1/00*
U.S. Cl. 260—112.5      10 Claims

ABSTRACT OF THE DISCLOSURE

Dipeptides of 6-(carbobenzyloxyamino)hexanoic acid and $N^\epsilon$-(substituted carbobenzyloxy) - L - lysines, useful as bronchial dilators.

SUMMARY OF THE INVENTION

The present invention is directed to novel chemical compositions of matter, more particularly, the dipeptides of 6-(carbobenzyloxyamino)hexanoic acid and $N^\epsilon$-(substituted carbobenzyloxy) - L - lysines corresponding to the formula

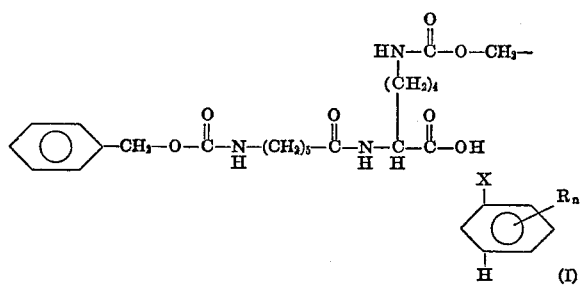

Throughout this specification, X represents hydrogen, chloro, or bromo, R represents chloro, fluoro, methyl, or methoxy, and $n$ represents one of the integers 0, 1, or 2, with the proviso that when $n$ represents zero, X represents chloro or bromo, and that when $n$ represents 1 or 2, X represents hydrogen.

The N-protected dipeptide compounds of the present invention are usually white crystalline solids at room temperature. In general, they are prepared by the procedure summarized in Figure 1 by a carbodiimide coupling of 6 - (carbobenzyloxyamino)hexanoic acid (II) and an appropriate $N^\epsilon$ - (substituted carbobenzyloxy) - L - lysine lower alkyl ester monohydrochloride (III). As used herein, the term "lower alkyl" (represented by R' in Figure 1) represents a saturated alkyl radical of from one to four carbon atoms. The resulting dipeptide lower alkyl esters (IV) thus obtained are saponified to obtain the $N^\alpha$-[6 - (carbobenzyloxyamino)hexanoyl] - $N^\epsilon$ - (substituted carbobenzyloxy) - L - lysines (I) comprising this invention, which are useful as bronchial dilators.

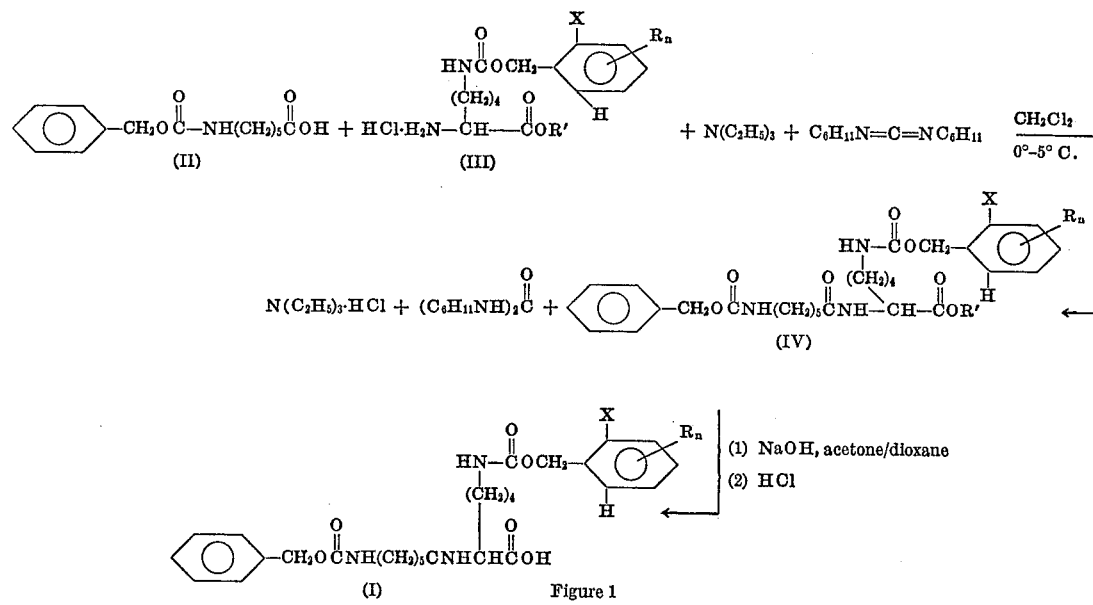

Figure 1

DESCRIPTION OF SOME PREFERRED EMBODIMENTS (A) Preparation of the Dipeptide Acids In the practice of this invention, the carbodiimide coupling is usually carried out by admixing 6-(carbobenzyloxyamino)hexanoic acid (II), the $N^\epsilon$ - (substituted carbobenzyloxy) - L - lysine lower alkyl ester monohydrochloride (III), and triethylamine in a suitable inert organic solvent such as methylene chloride, acetonitrile, or tetrahydrofuran. The resulting reaction medium is cooled to about 0±5° C. and dicyclohexylcarbodiimide, which is first dissolved in a fresh aliquot of the reaction solvent, is added to the chilled reaction medium. The quantities of the reactants used are not critical and essentially equimolar proportions of the reactants are usually employed. An amount slightly in excess of a stoichiometric amount of the hexanoic acid compound is preferred, however, in order to suppress acyl urea formation. After addition of the dicyclohexylcarbodiimide, agitation at about 0° C. is continued for about 3 hours. Thereafter, the reaction medium is allowed to warm to room temperature and agitation continued until the reaction is substantially complete, usually in about 3 additional hours, although further agitation up to 18 hours is not detrimental. Dicyclohexyl urea and precipitated salts which are produced as byproducts are removed from the reaction mixture by filtration. The lower alkyl ester intermediate (IV) is recovered from the filtrate by conventional techniques such as, for example, evaporation or distillation of the solvent. The crude intermediate can be further purified, if desired, by triturating with a suitable water-immiscible solvent such as, for example, ethyl acetate, followed by filtration to remove insoluble material, and washing and extraction of the filtrate by conventional solvent extraction techniques. The product can be recovered from the organic layer by conventional techniques such as evaporation or distillation as hereinbefore set forth. The lower alkyl ester residue can be further recrystallized, if desired, from hot ethyl acetate and cyclohexane.

The free $N^\epsilon$-(substituted carbobenzyloxy)-L-lysine lower alkyl ester can also be used as a starting material, if desired, instead of the monohydrochloride salt as described hereinbefore. When this embodiment is employed, the triethylamine is omitted from the procedure described above. The free ester is readily obtained by contacting the corresponding hydrochloride salt, either as prepared or in a purified form, dissolved in a suitable inert, water-immiscible solvent such as methylene chloride, with a sufficient quantity of aqueous bicarbonate solution to neutralize the hydrochloride, and thereafter washing and recovering the free ester from the organic solvent by conventional techniques such as evaporation or distillation.

The dipeptide acids (I) of this invention are readily obtained by saponification of the corresponding lower alkyl ester obtained by either of the procedures described above. The saponification proceeds readily when the lower alkyl ester (IV) is dissolved in an inert organic solvent, preferably a mixture of acetone and dioxane, and a quantity of either sodium hydroxide or potassium hydroxide slightly in excess of a stoichiometric amount is admixed with the solution. After the saponification reaction has proceeded to substantial completion, usually in about one-half to two hours, the product can be separated by dilution of the reaction mixture with water, followed by extraction with a non-polar water-immiscible organic solvent. If desired, the initial organic extract can be back extracted with a polar solvent such as a dilute aqueous salt solution and the polar solvent extract thus obtained combined with the initial aqueous medium prior to the acidification step. The dipeptide acid product (I) is recovered by removing the organic solvent by conventional procedures such as evaporation or distillation. The product can be purified, if desired, by conventional techniques such as recrystallization and washing from hot acetate and cyclohexane.

(B) Examples

The following examples further illustrate the present invention and the manner in which it can be practiced; they should be construed merely as being representative and not as limitations on the overall scope of the invention.

Example 1.—$N^\alpha$-[6-(carbobenzyloxyamino)hexanoyl]-$N^\epsilon$-(4-methylcarbobenzyloxy)-L-lysine:

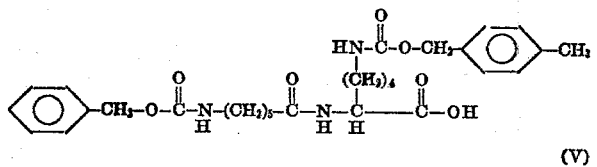

(V)

To an agitated suspension of 2.92 grams (0.011 mole) of 6-(carbobenzyloxyamino)hexanoic acid and 3.45 grams (0.01 mole) of $N^\epsilon$-(4-methylcarbobenzyloxy)-L-lysine methyl ester monohydrochloride in 60 milliliters of methylene chloride was added 1.34 milliliters (0.01 mole) of triethylamine. The resulting reaction medium was cooled to about 0° C. whereupon 2.06 grams (0.01 mole) of dicyclohexylcarbodiimide dissolved in about 10 milliliters of methylene chloride was added. Agitation of the reaction medium was continued at 0°±3° C. for about 3 hours and thereafter at room temperature for about 15 additional hours. The reaction mixture was filtered to remove dicyclohexyl urea and precipitated salts, the filter cake rinsed with about 30 milliliters of methylene chloride and the combined filtrate and rinse freed of solvent in vacuo. The resulting residue was triturated with about 150 milliliters of ethyl acetate and filtered. The filtrate was washed successively with a dilute salt water solution, twice with 10 percent citric acid, twice with a saturated bicarbonate solution, once with a dilute salt solution, and once with a saturated salt solution. The organic layer was dried over $MgSO_4$ and the solvent removed in vacuo. The residue was recrystallized by dissolving it in 35 milliliters of hot ethyl acetate, filtering the hot solution through fluted paper, diluting the hot filtrate with about 150 milliliters of hot cyclohexane to permanent turbidity and cooling. White crystals of the $N^\alpha$-[6-(carbobenzyloxyamino)hexanoyl]-$N^\epsilon$-(4-methylcarbobenzyloxy)-L-lysine methyl ester intermediate were recovered in a yield of 68%, based on the quantity of lysine methyl ester monohydrochloride used as a starting material.

A suspension of 2.8 grams (0.005 mole) of the methyl ester thus prepared in 10 milliliters of acetone and 20 milliliters of dioxane was heated and agitated until solution was complete, whereupon the solution was cooled rapidly to room temperature and 6.0 milliliters of 1.0 N aqueous sodium hydroxide added immediately to the agitated solution. After agitation had continued for about 2 hours, the reaction medium was diluted with about 100 milliliters of water and extracted first with about 100 milliliters and a second time with about 50 milliliters of ethyl acetate. The ethyl acetate extracts were combined and back-extracted with about 50 milliliters of dilute aqueous salt solution. The dilute salt layer and the initial aqueous layer were combined, acidified to a pH of about 3–4 by addition of hydrochloric acid, and twice extracted with 60 milliliters of ethyl acetate. The $N^\alpha$-[6-(carbobenzyloxyamino)hexanoyl]-$N^\epsilon$-(4-methylcarbobenzyloxy) - L - lysine product (V) was recovered as a residue from evaporation of the ethyl acetate in vacuo and purified by recrystallization from hot ethyl acetate and cyclohexane in the same manner as hereinbefore set forth for purification of the methyl ester intermediate. A 77 percent yield was realized. Elemental analysis showed 64.42 percent carbon, 7.31 percent hydrogen, and 7.86 percent nitrogen as compared with theoretical values of 64.30, 7.25, and 7.76 percent respectively. Melting point for the purified product was 108°–110° C.

Following the same general procedure of Example 1, each of the $N^\alpha$-[6-(carbobenzyloxyamino)hexanoyl]-$N^\epsilon$-(substituted carbobenzyloxy)-L-lysines listed in Table 1 was prepared.

TABLE 1

| Substituent | Mol. formula | Mol. wt. | Melting point, ° C. | Percent yield, methyl ester basis |
|---|---|---|---|---|
| When n=1: | | | | |
| 3-chloro | $C_{29}H_{36}ClN_3O_7$ | 562.05 | 99–101 | 87 |
| 4-chloro | $C_{29}H_{36}ClN_3O_7$ | 562.05 | 107–108 | 75 |
| 4-fluoro | $C_{29}H_{36}FN_3O_7$ | 545.60 | 107–109 | 88 |
| When n=2: | | | | |
| 3,4-dichloro | $C_{29}H_{35}Cl_2N_3O_7$ | 596.50 | 100–102 | 98 |
| When n=0: | | | | |
| 2-chloro* | $C_{29}H_{36}ClN_3O_7$ | 562.05 | *102–103 | 79 |

*Also exists in a polymorphic form of M.P. 103–105° C. which was prepared by coupling 6-(carbobenzyloxyamino)hexanoyl azide, prepared from the hydrazide and sodium nitrite, with $N^\epsilon$-(2-chlorocarbobenzyloxy)-L-lysine.

Example 2.—Nᵅ-[6-(carbobenzyloxyamino)hexanoyl]-Nᵉ-(3-methoxycarbobenzyloxy)-L-lysine:

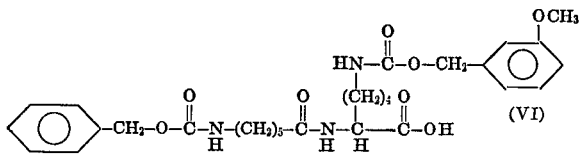

To a solution of 6.0 grams (0.0193 mole) of Nᵉ-(3-methoxycarbobenzyloxy)-L-lysine in 60 milliliters of methanol at about 0° C. was added dropwise and with agitation, 1.44 milliliters (0.02 mole) of thionyl chloride. Agitation was continued for an additional 10 minutes at about 0° C. and thereafter at about 40° C. for an additional 1.5 hours. The reaction mixture was allowed to stand for about 15 hours, whereupon the solvent was removed *in vacuo*. The thick oily residue which remained was dissolved in 100 milliliters of methylene chloride and contacted with 100 milliliters of a saturated aqueous potassium bicarbonate solution. The organic layer was washed with water and dried over $MgSO_4$/Drierite anhydrous calcium sulfate desiccant in the cold. The free methyl ester (5.7 grams, 0.0143 mole assuming 90 percent purity) was recovered as a residue upon removal of the solvent *in vacuo* and admixed with 4.73 grams (0.178 mole) of 6-(carbobenzyloxyamino)hexanoic acid in 55 milliliters of methylene chloride. The reaction medium was cooled to about 0° C. whereupon 2.95 grams (0.0143 mole) of dicyclohexylcarbodiimide dissolved in about 10 milliliters of methylene chloride was added. Thereafter, essentially the same procedure as described in Example 1 was followed to obtain the methyl ester intermediate and the Nᵅ-[6 - (carbobenzyloxyamino)hexanoyl]Nᵉ-(3-methoxycarbobenzyloxy)-L-lysine product. Analysis of the product, which has a melting point of 78°–80° C., showed 62.48 percent carbon, 7.05 percent hydrogen, and 7.58 percent nitrogen compared with theoretical values of 62.46, 7.05, and 7.54 respectively.

By essentially the same procedure described in Example 2, the following compound was prepared: Nᵅ-[6-(carbobenzyloxyamino)hexanoyl] - Nᵉ - (2-bromocarbobenzyloxy)-L-lysine, with an empirical formula of $$C_{28}H_{36}BrN_3O_7$$

a molecular weight of 606.51 grams per mole, and a melting point of 108°–109° C.

By following a procedure similar to that of Example 1 or Example 2, as appropriate, each of the compounds of this invention with the following substituents can also be prepared: 3-fluoro; 3-methyl; 4-methoxy; 3,4-difluoro, -dimethyl, and -dimethoxy; and 3,5-difluoro, -dichloro, -dimethyl, and -dimethoxy. In the preparation of the 4-methoxy compound, however, the citric acid extraction step in the purification of the lower alkyl ester intermediate is omitted. Instead, the ethyl acetate filtrate is admixed with Dowex® 50–X8 strong acid cation exchange resin in the hydrogen ion form for about one hour, the admixture filtered, washed, and the lower alkyl ester recovered from the ethyl acetate layer as hereinbefore set forth. The procedure of Example 1 is further modified in the saponification process in that instead of acidification by addition of hydrochloric acid, the aqueous layer is acidified by admixture with Dowex® 50–X8[H⁺] resin for about 90 minutes.

(C) Utility

It has been discovered by *in vitro* testing that the Nᵅ-[6 - (carbobenzyloxyamino)hexanoyl] - Nᵉ - (substituted carbobenzyloxy)-L-lysine compounds of the present invention are effective as bronchial dilators. The test procedures employed were based on the extent of relaxation produced by the test compound, when employed in a solution of oxygenated Tyrode's solution, on a spiral strip of guinea pig trachea suspended therein.

Example 3.—In one test procedure, the known bronchiodilator aminophylline, which produces approximately 100 percent relaxation when employed at a concentration of 120 micrograms per milliliter of solution, was used as a reference compound. When employed at a concentration of 120 micrograms per milliliter, hereinafter γ/ml., the compounds with the following substituents were all found to be at least 50 percent as active as aminophylline at the same concentration: 2-chloro, 3-chloro, 4-chloro, 4-methyl, 3-methoxy, 2-bromo, 4-fluoro, and 3,4-dichloro.

In a second run, the 4-chloro, 2-bromo, and 4-fluoro compounds were evaluated at a concentration of 60 γ/ml. and were found to be about 68 percent, 75 percent, and 60 percent as active respectively as was the reference compound aminophylline when employed at the same concentration.

Example 4.—In another procedure, each of the compounds listed in Table 2 was tested to determine the concentration at which the compound, when employed as hereinbefore set forth, elicits relaxation in at least 50 percent of the trachea specimens treated. The results are tabulated in Table 2. The $ED_{50}$ of aminophylline is 21.0 γ/ml. (±0.5).

TABLE 2

| Substituent, —R$n$: | $ED_{50}$, γ/ml. |
|---|---|
| When $n$ is 0: | |
| 2-chloro | 20.5 |
| When $n$ is 1: | |
| 3-chloro | 21.5 |
| 4-chloro | 15.0 |
| 3-methoxy | 50.0 |
| 4-methyl | 18.5 |
| When $n$ is 2: | |
| 3,4-dichloro | 31.0 |

(D) Preparation of the Lysine Starting Material

The Nᵉ-(substituted carbobenzyloxy)-L-lysines and the lower alkyl ester monohydrochloride derivatives thereof employed as starting materials generally were synthesized by the following series of reactions.

The procedure of Kjer and Larsen, *Acta Chem. Scand.*, 15, 750 (1961) was used to prepare the copper chelate of the Nᵉ-(substituted carbobenzyloxy)-L-lysine by reacting L-lysine monohydrochloride with basic aqueous cupric carbonate and water followed by the reaction of the product with the appropriate substituted benzyl chloroformate in the presence of magnesium oxide. (The substituted benzyl chloroformate was made from phosgene and the corresponding substituted benzyl alcohol, by essentially following the procedure described by Boissonnas and Preitner, *Helv. Chem. Acta*, 36 875 (1953).) Following the method of Folsch and Serk-Hanssen, *Acta Chem. Scand.*, 13, 1243 (1959), the chelate was freed of copper by contacting it with thioacetamide in a hot solution of dilute acetic acid, thus effecting precipitation of the copper as copper sulfide. The Nᵉ-(substituted carbobenzyloxy)-L-lysine was recovered from the filtrate upon cooling and was either employed directly as hereinbefore set forth in Example 2 or was admixed with the appropriate lower alkyl alcohol and thionyl chloride using the general procedure described by Shiba and Kaneko, *Bull. Chem. Soc. Japan*, 79, 65 (1968), to obtain the preferred lower alkyl ester hydrochloride (III) starting material.

(E) Preparation of the 6-(Carbobenzylamino) Hexanoic Acid Starting Material

The 6-(carbobenzyloxyamino)hexanoic acid (II) used as a starting material was synthesized by reacting benzyl chloroformate and ε-aminocaproic acid together in toluene in the presence of sodium hydroxide, and then treating the reaction mixture with hydrochloric acid in a procedure similar to that described by Zahn and Hilderbrand, *Chem. Ber.*, 90, 320 (1957).

What is claimed is:
1. A compound corresponding to the formula

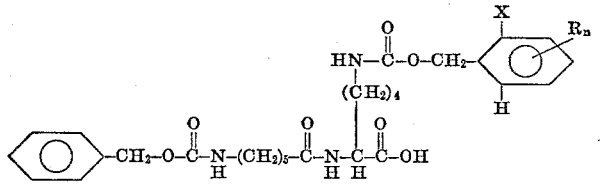

wherein X represents hydrogen, chloro or bromo; R represents chloro, fluoro, methyl or methoxy; and $n$ represents one of the integers 0, 1, or 2, with the proviso that when $n$ represents zero, X represents chloro or bromo and that when $n$ represents 1 or 2, X represents hydrogen.

2. A compound of Claim 1 wherein $n$ represents one of the integers 0 or 1.

3. The compound of Claim 1 which is $N^\alpha$-[6-(carbobenzyloxyamino)hexanoyl]-$N^\epsilon$ - (4 - methylcarbobenzyloxy)-L-lysine.

4. The compound of Claim 1 which is $N^\alpha$-[6-(carbobenzyloxyamino)hexanoyl]-$N^\epsilon$ - (3 - methoxycarbobenzyloxy)-L-lysine.

5. The compound of Claim 1 which is $N^\alpha$-[6-(carbobenzyloxyamino)hexanoyl] - $N^\epsilon$ - (2-chlorocarbobenzyloxy)-L-lysine.

6. The compound of Claim 1 which is $N^\alpha$-[6-(carbobenzyloxyamino)hexanoyl] - $N^\epsilon$ - (3-chlorocarbobenzyloxy)-L-lysine.

7. The compound of Claim 1 which is $N^\alpha$-[6-(carbobenzyloxyamino)hexanoyl] - $N^\epsilon$ - (4-chlorocarbobenzyloxy)-L-lysine.

8. The compound of Claim 1 which is $N^\alpha$-[6-(carbobenzyloxyamino)hexanoyl] - $N^\epsilon$ - (2-bromocarbobenzyloxy)-L-lysine.

9. The compound of Claim 1 which is $N^\alpha$-[6-(carbobenzyloxyamino)hexanoyl] - $N^\epsilon$ - (4-fluorocarbobenzyloxy-L-lysine.

10. The compound of Claim 1 which is $N^\alpha$-[6-(carbobenzyloxyamino)hexanoyl]-$N^\epsilon$ - (3,4-dichlorocarbobenzyloxy)-L-lysine.

References Cited
UNITED STATES PATENTS

| | | | |
|---|---|---|---|
| 3,474,083 | 10/1969 | Shiga et al. | 260—112.5 |
| 3,433,779 | 3/1969 | Vogler | 260—112.5 |

OTHER REFERENCES

Zahn et al.: Ann. Chem., 636, 117 (1960).

LEWIS GOTTS, Primary Examiner

R. J. SUYAT, Assistant Examiner

U.S. Cl. X.R.

424—177